US006465565B1

(12) United States Patent
Garcia et al.

(10) Patent No.: US 6,465,565 B1
(45) Date of Patent: Oct. 15, 2002

(54) ANIONIC WATERBORNE POLYURETHANE DISPERSIONS CONTAINING POLYFLUOROOXETANES

(75) Inventors: Guillermina C. Garcia, Akron, OH (US); Raymond J. Weinert, Macedonia, OH (US)

(73) Assignee: Omnova Solutions, Inc., Fairlawn, OH (US)

( * ) Notice: Subject to any disclaimer, the term of this patent is extended or adjusted under 35 U.S.C. 154(b) by 101 days.

(21) Appl. No.: 09/610,743

(22) Filed: Jul. 6, 2000

(51) Int. Cl.[7] ............................. C08J 3/00; C08K 3/20; C08L 75/00; B32B 27/00; B32B 27/40
(52) U.S. Cl. .................... 524/591; 428/423.1; 524/839; 524/840
(58) Field of Search ................................. 524/591, 839, 524/840; 428/423.1

(56) References Cited

U.S. PATENT DOCUMENTS

| | | |
|---|---|---|
| 3,100,722 A | 8/1963 | Hermann et al. |
| 3,834,823 A | 9/1974 | Seregely et al. |
| 3,922,457 A | 11/1975 | Barnwell et al. |
| 3,949,132 A | 4/1976 | Seregely et al. |
| 4,051,195 A | 9/1977 | McWhorter |
| 4,118,541 A | 10/1978 | Power et al. |
| 4,603,074 A | 7/1986 | Pate et al. |
| 4,686,275 A | 8/1987 | Bryant et al. |
| 4,746,576 A | 5/1988 | Ozu et al. |
| 4,857,396 A | 8/1989 | Otonari et al. |
| 4,898,981 A | 2/1990 | Falk et al. |
| 4,946,992 A | 8/1990 | Falk et al. |
| 4,988,123 A | 1/1991 | Lin et al. |
| 5,043,221 A | 8/1991 | Koleske |
| 5,045,624 A | 9/1991 | Falk et al. |
| 5,097,048 A | 3/1992 | Falk et al. |
| 5,230,954 A | 7/1993 | Sakamoto et al. |
| 5,324,764 A | 6/1994 | Fujita et al. |
| 5,361,164 A | 11/1994 | Steliga |
| 5,543,200 A | 8/1996 | Livigni et al. |
| 5,637,657 A | 6/1997 | Anton |
| 5,637,772 A | 6/1997 | Malik et al. |
| 5,649,828 A | 7/1997 | Kawashima |
| 5,650,483 A | 7/1997 | Malik et al. |
| 5,654,450 A | 8/1997 | Malik et al. |
| 5,663,289 A | 9/1997 | Archibald et al. |
| 5,668,250 A | 9/1997 | Malik et al. |
| 5,668,251 A | 9/1997 | Malik et al. |
| 5,674,951 A | 10/1997 | Hargis et al. |
| 5,681,890 A | 10/1997 | Tanaka et al. |
| 5,703,194 A | 12/1997 | Malik et al. |
| 5,807,977 A | 9/1998 | Malik et al. |
| 6,168,866 B1 | 1/2001 | Clark |
| 6,313,335 B1 * | 11/2001 | Roberts et al. |

FOREIGN PATENT DOCUMENTS

| | | |
|---|---|---|
| EP | 0 348 350 | 12/1989 |
| JP | 62169641 | 7/1987 |
| JP | 63248827 | 10/1988 |
| JP | 03275859 | 12/1991 |
| JP | 04363370 | 12/1992 |
| JP | 07004064 | 1/1995 |
| JP | 07039812 | 2/1995 |
| JP | 08283654 | 10/1996 |
| WO | WO 96/18699 | 6/1996 |
| WO | WO 96/23828 | 8/1996 |
| WO | WO 99/26992 | 6/1999 |
| WO | WO 99/45079 | 9/1999 |

OTHER PUBLICATIONS

Advances in Urethane Ionomers, *Urethane Ionomers*, H. X. Xioa, K. C. Frisch, G. S. L. Hsu and H. A. Al–Salah, pp. 23–52, copyright 1995, published by Technomic Publishing Company, Inc., 851 New Holland Avenue, Box 3535, Lancaster, PA, 17604 USA.
Invoice to Southwest Texas Distributions, Inc. dated Apr. 9, 1998 from GenCorp.
10 pages of World Patent Index search results based on PVC and fluoro . . . coating.
4 pages of World Patent Index search results based on PVC and polyester coating.
40 pages of Chemical Abstract search results based on PVC and fluoro . . . coating.
25 pages of Chemical Abstract search results based on PVC and polyester.
CA entries and Derwent patent family printouts on JP 03275859; JP 04363370; JP 07004064; JP 07039812; JP 08283654; JP 6216941; and JP 63248827.
Letter to Southwest Texas Distributions, Inc. dated Mar. 5, 1998 to Greg Nernes from Barry Bastion, Product Manager, GenCorp.
60/144,375, Malik, et al., filed Jul. 16, 1999.
Pending Regular Application of Provisional 60/144,375, Malik, et al., filed Jul. 13, 2000.
U.S. patent application Ser. No. 60/144,375, Malik et al., filed Jul. 16, 1999.
U.S. patent application Ser. No. 60/144,375, Malik et al., filed Jul. 13, 2000.

* cited by examiner

*Primary Examiner*—Patrick D. Niland
(74) *Attorney, Agent, or Firm*—Daniel J. Hudak; Robert F. Rywalski

(57) ABSTRACT

Anionic waterborne polyurethane dispersions are formed in the presence of polyfluorooxetane oligomers, polymers, or copolymers so that the polyfluorooxetanes are incorporated in the polyurethane. Coatings made from such polyurethanes have good low temperature flexibility, good chemical resistance and abrasion resistance, as well as a low coefficient of friction. Alternatively, the anionic water borne polyurethane dispersion can be blended with vinyl ester monomers such as various acrylates and subsequently polymerized by radiation, for example ultraviolet light, to form a comingled blend of at least two different types of polymers.

58 Claims, No Drawings

ANIONIC WATERBORNE POLYURETHANE DISPERSIONS CONTAINING POLYFLUOROOXETANES

FIELD OF THE INVENTION

The present invention relates to aqueous dispersions of polyurethanes having polyfluorooxetane segments or moieties therein and further to coatings made from such dispersions. The present invention further relates to blends of the polyurethane aqueous dispersion containing vinylester monomers which can be subsequently polymerized as by radiation to form a co-mingled blend of polymers.

BACKGROUND OF THE INVENTION

U.S. Pat. No. 5,447,982 to Kamba et al. relates to a process for preparing an aqueous dispersion, which comprises subjecting a monomer to emulsion polymerization in an aqueous medium in the presence of a fluorine-containing copolymer comprising units derived from a fluoroolefin, and units having a hydrophilic side chain.

U.S. Pat. No. 5,464,897, Das et al., relates to an aqueous fluoroccipolymer dispersion prepared by aqueous dispersion polymerization of a) a dispersed phase containing a fluoroolefin monomer component and a vinyl ether monomer component in the presence of b) a base neutralized, aqueous dispersion of a polymeric dispersant having an acid value of at least 1.5 mg KOH/gram not exceeding about 35 mg KOH/gram and the amount of neutralizing base does not exceed about 10 percent based on resin solids of the dispersant.

Japanese Publication 04,131,165 relates to a waterborne base coat of internally-crosslinked resin particles as binders, and pigments; and a waterborne clear coat containing fluoropolymer binders. Thus, an Al panel was sprayed with a colored aqueous solution containing allyl methacrylate-Bu acrylate-acrylic acid-hydroxyethyl methacrylate-Me methacrylate copolymer particles, set at 80.degree. for 15 min, covered with an aqueous clear solution containing acrylate-methacrylic acid-2-methacryloyloxyethyl isocyanate-chlorotrifluoroethylene-cyclohexyl vinyl ether-Et vinyl ether-hydroxybutyl vinyl ether copolymer binder, and baked at 160.degree. for 25 min to give a surface with 60. degree. gloss 94%, and water (240 h, 40.degree.$H_2O$) and weather (2000 h) resistance.

Japanese Publication 06,145,598, relates to coatings, having lubricity, contain polyurethanes prepared from polyisocyanates and fluoro oxyalkylenes containing 2 active H atoms. An aqueous composition containing adipic acid-ethylene glycol-isophthalic acid-neopentyl glycol-terphthalic acid-dimethylolpropionic acid-Fomblin Z Doltx 2000 (perfluoro polyether polyol)-Coronate T 80 block copolymer gave films with water contact angle 101.degree., vs. 103, 62, and 0.35, resp., for a film prepared similarly without the Fomblin Z Doltx 2000.

Japanese Publication 06,287,548, K. Ito et al. relates to an aqueous coating composition containing a polyurethane resin which is obtained by reacting, as essential reactants, a compound having fluorinated oxyalkylene units and at lease two active hydrogen atoms (e.g. a hydroxyl-and/or carboxyl-terminated fluoropolyether having a molecular weight of 500–7,000) with a polyisocyanate (e.g. 2,4-toluene diisocyanate). The composition can be used for surface lubricity and wear resistance, and oil repellency, antifouling properties, blocking resistance, and adhesiveness.

Japanese Publication 07179809, K. Shinichi et al., relates to dispersions, which are crosslinkable with water-based hardeners and provide coatings with weatherability, contain polymers including (A) units based on fluoroolefins, (B) units comprising hydrophilic group-containing Macromonomers, and (C) units from OH-substituted monomers XYZ (X=radically polymerizable unsatd. Group; Y=C. 5 linear, branched, or alicyclic group-containing Alkylene-containing divalent linking groups; Z=OH). Thus, cyclohexyl vinyl ether 16.6, Et vinyl ether 16.4, CH2;CHOCH2C6H10CH20 (CH2CH20) n H 3.8, and chlorotrifluoroethylene 52.7 g in water contg. $K_2CO_3$, $NaHSO_3$, ammonium persulfate, Newcol 1110 (nonionic emulsifier), and Na lauryl sulfate were reacted at 30.degree. for 12 h to give a latex showing prevention of coagulation in homogenizing.

WO Publication 99/26992 relates to coatings which have low surface energies provided by fluorine and/or silicone moieties. Aqueous dispersions of externally chain extended polyurethane compositions terminated by hydrolyzable and/or hydrolyzed silyl groups and containing dispersing or emulsifying groups, particularly carboxyl groups are provided. Also polyurethane dispersions which are substantially organic solvent free which cure to water are provided. The compound $R_fR'_fCFCOOCH_2C(R)(CH_2OH)_2$ is provided.

U.S. Pat. No. 5,780,117 relates to radiation-curable latex compositions having a secondary curing mechanism. In these compositions, an anionically stabilized, water-borne dispersion of one or more radiation-curable resins is combined with a low molecular weight compound having at least two reactive functional groups, wherein one reactive functional group comprises an epoxy and the other reactive functional group comprises either an epoxy or a functionality capable of self-cordensation after film formation. Also disclosed is a method for providing a cross-linked protective coating on a substrate, wherein a coating of the composition of the present invention is applied to the substrate, the coated substrate is exposed to actinic radiation to effect curing, and then the unexposed or underexposed portions of the coated substrate are allowed to cure at room temperature or greater.

European Disclosure 00331409 relates to a process for producing a polyester film having a thin cured polyurethane coating, which comprises (1) applying an aqueous composition comprising a thermosetting polyurethane prepolymer as a film-forming component to at least one surface of an unoriented aromatic polyester film to form a thin wet coating on it, said polyurethane prepolymer being characterized by (i) having a polyol component at least 10% by weight of which is composed of a polyol containing a carbon-carbon double bond selected from unsaturated polyester polyols and polybutadiene polyols, the carbon-carbon double bond being cleavable under ultraviolet light, (ii) having a pendant anionic hydrophilic group in the polymer chain, and (iii) having isocyanate groups blocked with an oxime at the ends of the polymer chain, and (2) thereafter stretching and heat-setting the coated film, during which time the wet coating of the aqueous composition is dried and the polyurethane prepolymer is cured to form a thin cured polyurethane coating having a carbon-carbon double bond on the biaxially oriented polyester film.

U.S. Pat. No. 4,107,013 relates to an improved ultraviolet curable aqueous latex paint suitable for use as coil coatings comprising a high molecular weight primary latex binder in combination with minor amounts of an emulsified low molecular weight cross-linking agent adapted to cross-link the high molecular weight latex particles upon exposure to ultraviolet energy.

SUMMARY OF THE INVENTION

Generally, various amounts of polyfluorooxetane oligomers or polymers which have one or two fluorinated side chains, or a copolymer thereof made from various cyclic comonomers such as oxirane, for example epichlorohydrin, monomers having a four member cyclic ether group such as trimethylene oxide, monomers having a five member cyclic ether group such as tetrahydrofuran, and the like; can be reacted with aqueous carboxylic acid dispersants, and with a polyol intermediate such as various polyesters, or polycarbonate polyols, or other polyol intermediates to form a polyurethane generally utilizing an excess of a polyisocyanate during an in-situ bulk polymerization. A neutralizing agent such as a tertiary amine reacts with the acid group of the carboxylic acid dispersant to form a salt which renders the polyurethane dispersible in subsequently added water. The polyurethane can be chain extended in the aqueous medium whereby the polymer has amine end groups providing an aqueous dispersion of polyurethane particles which can be utilized as a coating having desirable properties such as chemical resistance, a low coefficient of friction, good abrasion resistance, and the like. Also, to the waterborne polyurethane composition can be added a free radical, radiation polymerizable monomer or oligomer such as various acrylates. A photoinitiator is desirably utilized in order to permit the free radical polymerizable monomers to be polymerized by ultraviolet light, electron beam, and the like. Generally, the aqueous polyurethane dispersion-free radical polymerizable monomer or oligomer blend is coated on a substrate and dried in order to eliminate water. The free radical monomers or oligomers are then cured by radiation as for example U.V. light to form a coating or laminate. Upon the formation of an end use application, the acid and amine groups from the polyurethane optionally can be cross-linked. The waterborne polyurethane dispersion or blend thereof can be applied as a coating to various substrates such as metals, plastics such as polyvinyl chloride, wood, fiberboard, pressboard, plywood, paper, or wall covering, and dried with heat.

DETAILED DESCRIPTION OF THE INVENTION

The polyfluorooxetane is generally prepared by utilizing a monoalcohol or a diol having from 1 or 2 to about 40, desirably from about 1 or 2 to about 18, and preferably from about 1 to about 10 carbon atoms as an initiator. Examples of specific types of monohydric alcohols include the various aliphatic alcohols such as the paraffinic alcohols, for example methyl alcohol, ethyl alcohol, propyl alcohol, etc., or the olefinic alcohols, for example vinyl alcohol, allyl alcohol, and the like. Various alicyclic alcohols such as cyclohexanol and the like can also be utilized, as well as various aromatic or alkyl substituted aromatic alcohols such as benzyl alcohol, phenol, and the like. Various heterocyclic alcohols can also be utilized such as furfuryl alcohol, and the like. Moreover, halogenated alcohols and especially fluoroalcohols are desired such as trifluoroethanol, heptafluorobutanol, and the like. Especially preferred monohydric alcohols include benzyl alcohol, trifluoroethanol, heptafluorobutanol, and allyl alcohol. Examples of suitable diols include ethylene glycol, propylene glycol, and the like with butanediol being preferred.

The oxetane monomer used to form the polyfluorooxetane generally has the structure

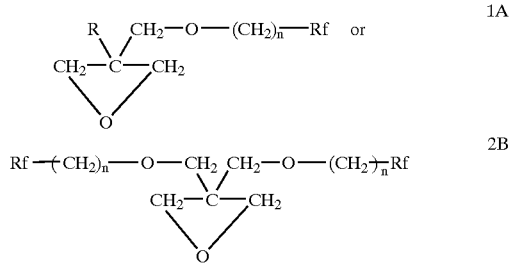

The repeat unit of a polyfluorooxetane polymer derived from the oxetane monomer 1A or 1B with a monoalcohol initiator respectively has the formula

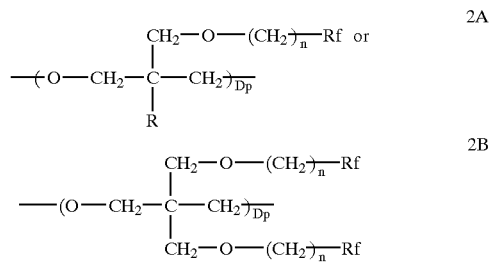

and the polyfluorooxetane oligomer or polymer respectively has the formula

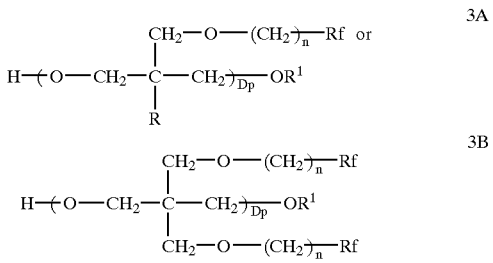

When the oxetane initiator is a diol, the repeat unit derived from the oxetane monomer 1A or 1B will be the same as set forth above respectively in formula 2A and formula 2B but the oligomer or polymer thereof will have the formula

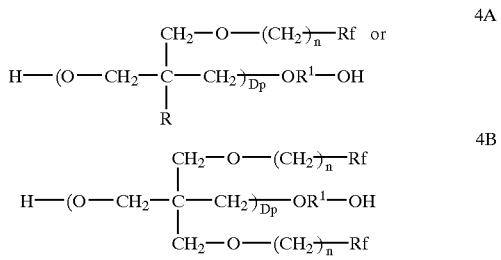

In the above formulas, n is the same or different and, independently, on each repeat group, is an integer of from 1 to about 5 and preferably 1 or 2, R is hydrogen or an alkyl of 1 to about 6 carbon atoms and preferably is methyl, and each $R_f$ is the same or different and, independently, on each repeat unit, is a linear or branched fluorinated alkyl of 1 to about 20 carbon atoms, a minimum of 25%, 50%, 75%, 85%, 90%, or 95%, or 100% (perfluoronated), of the non-carbon atoms of the alkyl being fluorine atoms and optionally the remaining non-carbon atoms being H, I, Cl, or Br; or each $R_f$ is the same or different and individually is an oxyperfluorinated polyether having from 4 to about 60 carbon atoms. $R^1$ is derived from the alcohol initiator and has from 1 to about 40 carbon atoms and is an aliphatic, an alicyclic, an aromatic, an alkyl substitute aromatic, a heterocyclic, or a halogenated derivative thereof. Preferably, the total number of carbon atoms is from about 1 to about 18. The amount of the fluorooxetane monomers utilized is sufficient to yield a degree of polymerization (DP) of from about 2 to about 150 or 250, desirably from about 3 to about 50, and preferably from about 12 to about 25. Such polyfluorooxetanes are generally available from GenCorp of Sacramento, California as for example, Poly-3 Fox and Poly-7 Fox, i.e.

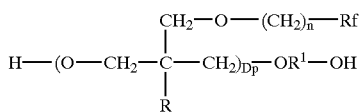

wherein for Poly-3 Fox Rf is $CF_3$ and for Poly-7 Fox Rf is $C_3F_7$.

The various above described polyfluorooxetanes can be made as described in U.S. Pat. Nos. 5,650,483; 5,668,250 and 5,663,289 hereby fully incorporated by reference.

Generally, any suitable cationic catalyst can be utilized to polymerize the fluorooxetane monomers such as various Lewis acids and complexes thereof. Examples of such cationic catalysts include $Sn(IV)Cl_4$, antimony pentafluoride, phosphorous pentafluoride, and the like, with a complex of borotrifluoride and tetrahydrofuran being preferred. Optionally, various co-catalysts can be utilized such as water, butanediol, cyclohexanedimethanol, and the like.

The polymerization is generally carried out in the presence of a catalyst as well as in a solvent for the diol and the fluorooxetane monomers. Examples of suitable solvents include trifluorotoluene, dichloroethane, dimethylformamide, as well as dichloromethane. The amount of alcohol and catalysts will generally vary inversely with the desired molecular weight of the polymer. That is, inasmuch as polymerization is initiated by each alcohol and catalyst molecule generally on a quantitative basis, for a given amount of fluorooxetane monomers, the molecular weight of the polyfluorooxetane oligomer or polymer will be determined by the amount of alcohol utilized.

The reaction rate will vary with temperature. Accordingly, the reaction time is generally from 2 hours to 40 hours, and desirably is from about 4 to about 24 hours. The polymerization temperatures are generally from about 0° C. up to about 100° C., and desirably from about 18° C. to about 50° C.

The fluorooxetane monomers can also be copolymerized with a variety of monomers having epoxy (oxirane) functionality such as epichlorohydrin, propylene oxide, ethylene oxide, butyl glycidylether, and perfluorooctyl propylene oxide; monomers having a 4-membered cyclic ether group such as trimethylene oxide, 3,3-bis(chloromethyl)oxetane, 3,3-bis(bromomethyl)oxetane, and, 3,3-bromomethyl (methyl) oxetane; monomers having a 5 membered cyclic ether group such as tetrahydrofuran, tetrahydropyran, and 2-methyltetrahydrofuran; and the like. Still other suitable monomers includel 1,4-dioxane, 1,3-dioxane as well as trioxane and epsilon-caprolactone. The copolymerization reaction is carried out generally under the same conditions as the polymerization of the fluorooxetane monomers set forth hereinabove. The amount of the comonomer is from about 1% to about 90% by weight, desirably from about 1.5% to about 50% by weight, and preferably from about 2% to about 10% by weight based upon the total weight of the one or more comonomers and the fluorooxetane monomers.

The one or more polyfluorooxetane oligomers, polymers, or copolymers can have an acid group on the end thereof in lieu of the above-noted one or two hydroxyl groups. That is, the oligomer, polymer, or copolymer can be reacted with a dicarboxylic acid to form a half ester wherein one of the carboxylic acid groups is reacted with the polyfluorooxetane hydroxyl group, and the remaining group is an acid group. This acid terminated polyfluorooxetane then can be reacted, along with the carboxylic acid dispersant and the polyol intermediate with the one or more polyisocyanates. Suitable dicarboxylic acids generally contain from 2 to 20 carbon atoms with from about 4 to about 15 carbon atoms being preferred such as succinic acid, glutaric acid, adipic acid, maleic acid, and the like.

The polyurethane is made in situ. That is the following reactants or components are reacted: the one or more of the hydroxyl terminated (or acid terminated) polyfluorooxetane oligomers or polymers or copolymers, the one or more polyol intermediates, the one or more hydroxyl terminated carboxylic acid dispersants, with one or more polyisocyanates. The net result is a polyurethane containing moieties or segments (i.e. one or more repeat groups) of the polyol intermediate, the aqueous acid dispersant, and the polyfluorooxetane oligomer, polymer, or copolymer thereof.

The polyol intermediate is generally a polyether polyol, preferably a polythioether polyol, a polyacetal polyol, a polyolefin polyol, an organic polyol, preferably a polycarbonate polyol, or preferably a polyester polyol, or combinations thereof, desirably having primary hydroxy groups and having a number average molecular weight of from about 400 to about 15,000 and desirably from about 2,000 to about 9,000. Such polyols and the preparation thereof is well known to the art and to the literature.

The polyether polyols generally are derived from monomers containing from 2 to 10 carbon atoms. Such polyols include polyoxypropylene or polyoxy ethylene diols and triols, poly(oxyethylene-oxypropylene) diols and triols, and the like.

Poloythioether polyols which can be used include products obtained by condensing monomers such as thiodiglycol either alone or with other glycols, dicarboxylic acids, formaldehyde, aminoalcohols or aminocarboxylic acids.

Polyacetal polyols which can be used include those prepared by reacting monomers, for example, glycols such as diethylene glycol, triethylene glycol and hexanediol with formaldehyde. Suitable polyacetals may also be prepared by polymerizing cyclic acetals.

Suitable polyolefin polyols include hydroxy-terminated butadiene homo- and copolymers.

Organic polyols having molecular weights below 400 can also be used in the preparation of the prepolymers particularly include those made from monomers such as diols and triols and mixtures thereof, but higher functionality polyols can be used. Examples of such lower molecular weight monomers include ethylene glycol, diethylene glycol, tetraethylene glycol bis(hydroxyethyl) terephthalate, cyclohexane dimethanol, furan dimethanol, glycerol, neopentyl glycol and the reaction products, up to molecular weight 399 of such polyols with propylene oxide and/or ethylene oxide.

The preferred polycarbonate polyols which can be used include products obtained by reacting monomers such as diols having from 2 to 10 carbon atoms such as 1,3-propanediol, 1,4-butanediol, 1,6-hexanediol, diethyene glycol or tetraethylene glycol with diaryl carbonates having from 13 to 20 carbon atoms, for example diphenyl carbonate, or with phosgene.

The preferred polyester polyols are typically formed from the condensation of monomers such as one or more polyhydric alcohols having from 2 to 18 carbon atoms with one or more polycarboxylic acids or their anhydrides having from 2 to 14 carbon atoms. Examples of suitable polyhydric alcohols include the following: ethylene glycol, propylene glycol such as 1,2-propylene glycol and 1,3-propylene glycol, glycerol; pentaerythritol; trimethylolpropane; 1,4,6-octanetriol; butanediol; pentanediol; hexanediol; dodecanediol; octanediol; chloropentanediol, glycerol monoallyl ether; glycerol monoethyl ether, diethylene glycol; 2-ethylhexanediol-1,4; cyclohexanediol-1,4; 1,2,6-hexanetriol; neopentyl glycol; 1,3,5-hexanetriol; 1,3-bis-(2-hydroxyethoxy)propane and the like. Cyclic ethers with desirably 2 to 18 carbon atoms may be used instead, but they are more expensive to use. Examples of polycarboxylic acids include the following: phthalic acid; isophthalic acid; terephthalic acid; tetrachlorophthalic acid; maleic acid; dodecylmaleic acid; octadecenylmaleic acid; fumaric acid; aconitic acid; trimellitic acid; tricarballylic acid; 3,3'-thiodipropionic acid; succinic acid; adlipic acid; malonic acid, glutaric acid, pimelic acid, sebacic acid, cyclohexane-1,2-dicarboxylic acid; 1,4-cyclohexadiene-1,2-dicarboxylic acid; 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Polyesters from lactones (for example caprolactone) can also be used.

Preferred polyol intermediates include polyesters as prepared from the reaction between adipic acid or phthalic acid or isomers thereof with glycols such as ethylene glycol, propylene glycol, butylene glycol, diethylene glycol, hexamethylene glycol, trimethylolpropane, or trimethylolethane. Specific polyester intermediates include poly(ethylene adipate)glycol, poly(diethylene adipate)glycol, poly(ethylene/propylene adipate)glycol, poly(propylene adipate)glycol, poly(butylenes adipate)glycol, poly(neopentyl adipate)glycol, poly(hexamethylene adipate)glycol, poly(hexamethylene/neopentyl adipate)glycol, and the like.

The hydroxyl terminated carboxylic acid dispersant can generally be any organic compound which contains one or more carboxy groups and two or more hydroxyl groups such as a carboxyl group containing diol or triol. Generally, such compounds can contain a total of from about 4 to about 24 carbon atoms with from about 4 to about 8 carbon atoms being preferred. An example of such a suitable dispersant has the formula

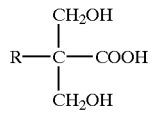

wherein R is hydrogen or alkyl containing from 1 to about 16 carbon atoms. A preferred carboxy containing diol is 2,2-dimethylol propionic acid. If desired, the carboxy containing diol or triol may be incorporated into a polyester by reaction with a dicarboxylic acid before being incorporated into the polyurethane prepolymer. Useful compounds include the fumarate polyether glycols described in U.S. Pat. No. 4,460,738. Other useful carboxy-containing compounds include aminocarboxylic acids, for example lysine, cystine and 3,5-diaminobenzoic acid.

The one or more polyisocyanates which are utilized generally have the formula $R(NCO)_n$ where n is an integer of 2, 3 or 4 with approximately 2 being preferred. However, it is to be understood that since combinations of various polyisocyanates can be utilized, the equivalent amount of isocyanate can vary and often n is not an integer. R is an aliphatic having from about 2 to about 20 carbon atoms with from about 6 to about 15 carbon atoms being preferred, an aromatic including an alkyl substituted aromatic having from about 6 to about 20 carbon atoms with from about 6 to about 12 carbon atoms being preferred, or combinations thereof. Aliphatic diisocyanates are preferred inasmuch aromatic diisocyanates tend to yellow. Examples of suitable polyisocyanates include hexamethylene diisocyanate, 2,2,4- and/or 2,4,4-trimethyl hexamethylene diisocyanate, p- an m-tetramethyl xylene diisocyanate, methylene bis(4-cyclohexyl isocyanate) (hydrogenated MDI), 4,4-methylene diphenyl isocyanate (MDI) mixtures of MDI with polymeric MDI having an average isocyanate functionality of from about 2 to about 3.2, p- and m-phenylene diisocyanate, 2,4- and/or 2,6-toluene diisocyanate (TDI) and adducts thereof, and isophorone diisocyanate (IPDI). Also useful are diisocyanates prepared by capping low molecular weight compounds, that is less than 300, such as epsilon-caprolactam, butanone oxime, phenol, etc., with diisocyanates. Any combination of polyisocyanates can be employed. Preferred polyisocyanates include aliphatic diisocyanates such as IPDI, MDI, hexamethylene diisocyanate, and the like.

The equivalent weight ratio of the one or more diisocyanates to the total of the one or more polyol intermediates, as well as to the one or more polyfluorooxetane oligomers, polymers, or copolymers, as well as the one or more hydroxyl terminated carboxylic acid dispersants, can be from about 0.8 to about 5.0, and desirably from about 0.9 to about 1.8. The amount of the one or more hydroxyl containing compounds can vary widely with respect to each other. The equivalent weight ratio of the one or more polyol intermediates to the one or more polyfluorooxetane oligomers, polymers, or copolymers, is from about 2 or 5 to about 100 or 200, and, desirably from about 15 or 20 to about 35 or 50. The weight of the at least one hydroxyl terminated carboxylic acid dispersant is from about 1% to about 15%, desirably from about 2% to about 10%, and preferably from about 3% to about 8% based upon the total weight of all of the polyol intermediates.

The reaction conditions of forming the polyurethane generally known to the art and to the literature and include a reaction temperature of from about 40° C. to about 160° C., desirably from about 55° C. to about 150° C., and preferably from about 65° C. to about 100° C. Catalysts are desirably utilized and include conventional compounds such as dibutyl tin dilaurate, stannous octoate, diazobicyclo (2.2.2) octane (DABCO), Zn ACAC, tin octoate, and the like. The amount of catalyst is small, generally from about 0.005 to about 0.2 parts by weight per 100 parts by weight of the urethane forming monomers. Suitable solvents can be utilized such as N-methyl-pyrrolidone, toluene, and the like.

Although all the various polyols, that is the polyfluorooxetane oligomer, polymer, or copolymer, the hydroxyl terminated carboxylic acid dispersant, and the polyol intermediate can be all added at once and reacted with the diisocyanates, they can be reacted separately. For example, the one or more polyol intermediates and/or the one or more polyfluorooxetane oligomers, polymers, or copolymers, can be reacted with the one or more diisocyanate, and then subsequently the acid dispersant can be reacted with the diisocyanate, and the like.

Once the one or more polyurethanes have been formed, they are converted into an aqueous solution or dispersion. To obtain good solubility or dispersability in water, a neutralizing agent is added to the polyurethane solution to form a salt of the hydroxyl containing carboxylic acid dispersant. Neutralizing agents include an inorganic base, ammonia, amine, and the like. When amine neutralizing agents are utilized, a number of amine groups therein can generally range from about 1 to about 3 or 4 and the total number of carbon atoms can range from about 2 or 3 to about 12. Inorganic bases include sodium hydroxide and potassium hydroxide, while the amines, in addition to ammonia include trimethylamine, triethylamine and dimethylethanolamine. The neutralizing agents can be used in either substoichiometric or excess quantities. Accordingly, the stoichiometric ratio can generally vary from about 0.9 to about 1.2 and preferably from about 1.0 to about 1.05 based upon the equivalent weight of the neutralizing agent to the equivalent weight of the acid dispersant. Use of the neutralization agent changes the dispersant into a salt thereby generally rendering the polyurethane dispersible in water.

Only after the polyurethane has been neutralized, can water be added to form a waterborne polyurethane solution. The amount of water is generally such that the solid content of the solution is generally from about 20 or 30 to about 65, and preferably from about 35 to about 50 percent by weight.

While optional, it is desirable to chain extend the various above noted polyurethanes after neutralization. The chain extender can be a polyol, an amino-alcohol, ammonia, a primary or secondary aliphatic, alicyclic, aromatic, arylaliphatic, or heterocyclic amine, especially a diamine, hydrazine or a substituted hydrazine.

Examples of suitable chain extenders useful herein include ethylene diamine, diethylene triamine, triethylene tetramine, propylene diamine, butylene diamine, hexamethylene diamine, cyclohexylene diamine, piperazine, 2-methyl piperazine, phenylene diamine tolylene diamine, xylylene diamine, tris(2-aminoethyl)amine, 3,3'-dinitrobenzidine, 4,4'-methylenebis (2-chloroaniline), 3,3'dichloro-4,4'-biphenyl diamine, 2,6-diaminopyridine, 4,4'-diaminophinylmethane, methane diamine, m-xylene diamine and isophorone diamine.

The chain extension can be conducted at elevated, reduced or ambient temperatures. Convenient temperatures are from about 5° to 95° C., preferably from about 35° C. to about 65° C.

The amount of chain extender can vary greatly but is generally from about 0.5 to about 2.0 parts by weight for every 100 parts by weight of the formed polyurethane.

The above formed and chain extended compounds are anionic waterborne polyurethane particles dispersed in water and such dispersions generally have low viscosities, i.e. less than 500 centipoises, and desirably from about 60 to about 400 centipoise, and preferably from about 120 to about 300 centipoise.

If desired, the polyurethane of the present invention can be crosslinked in any conventional manner. Accordingly, suitable crosslinking agents can be added to the waterborne solution such as various aziridines, carbodimides, epoxies, melamine-formaldehyde, or polyisocyanates, or the like. As used herein, the term aziredene refers to any alkyleneimine and includes any compound based on the following structure:

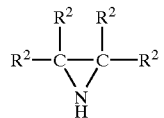

wherein each $R^2$, independently, is hydrogen, an alkyl radical having 1 to 3 carbon atoms, phenyl or combinations hereof.

Preferably, the arizidine is based on the following structure:

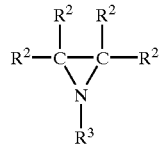

wherein each $R^2$ is as described above and $R^3$ is hydrogen or an alkylene radical having 1 to 4 carbon atoms. Such aziridines include ethyleneimine, ethyl ethylenimine, and propyleneimine. The aziridine compound of the present invention also includes polyfunctional aziridines. Particularly useful polyfunctional aziridines include trimethylolpropanetris-(B-(N-aziridinyl) propionate) and pentacrythritol-tris(BN-aziridinyl)propionate) which are available commercially from Virginia Chemicals of Portsmith, VA as XAMA-2 and XAMA-7, respectively. A highly preferred aziridine is available as CX100 from Avecia.

Examples of suitable (poly)carbodimides include multifunctional carbondimides such as Ucarlink XL-29SE form Union Carbide. Examples of suitable epoxies include bisphenol A types such as Epon 828 and 825 from Shell. Examples of suitable polyisocyanates include Desmodur DA (1,6-hexamethylene diisocyanate (HDI) based polyisocyanates) as well as HDI biurets such as Desmodur N75 BAX, N75 BA, N3200, or N3390; or HDI dimers or trimers such as Desmodur N3200, or IPDI trimers such as Desimodur Z4470 MPAIX or Z4470 SN. Examples of suitable melamirie-formaldehydes include methylated melamine formaldehyde such as Cymel 373, 303, and 385 from Cytec, and Resimene 797, or 747, from Soltia.

Such urethane crosslinking agents are thermally activated such as at temperatures of from about 25° C. to about 175° C., and from about 60° C. to about 80° C. When activated, they crosslink the polyurethane and form a more rigid polymer. The amount of such urethane crosslinking agents is generally from about 1 to about 15, and desirably from about 3 to about 10 parts by weight based upon every 100 parts by weight of the polyurethane whether or not chain extended.

The polyurethanes of the present invention which are formed or polymerized in the presence of the polyfluorooxetane are generally free of silyl groups, whether hydrolyzed or hydrolyzable. They are also desirably free of any silicone groups which include various siloxanes such as organosiloxanes, and the like. By generally free of, it is meant that the polyurethane particles generally contain about 5 or less, desirably about 3 or less, or preferably about 1 parts by weight or less, even more preferably 0 parts by weight of such compounds per 100 parts by weight of the polyurethane particles.

The waterborne polyurethane dispersions of the present invention are useful as a coating such as a layer, film, or membrane to coat, either directly or indirectly, a substrate.

The substrate can be generally any plastic such as polyvinyl chloride, nylon, polyester, polyolefin, polyurethane, polycarbonate, polystyrene, a polyacrylic such as polyacrylate, and the like, as well as combinations thereof. Plastics can also include various fibers woven into various articles and especially carpet fibers such as nylon fibers, polyolefin fibers, polyacrylic fibers, polyester fibers, and the like, and combinations thereof. Plastics also include plastic wall covering such as made from polyvinyl chloride. Other substrates include paper or wood containing articles such as paper sheets, cardboard, corrugated paper or cardboard, and the like. Wood containing articles include wood such as oak, maple, other hard woods or soft woods, particle board, pressed board, fiber board, laminated wood, and the like as well as combinations thereof. Metals generally include any type of metals such as iron, steel, aluminum, copper, brass, and the like as well as combinations thereof. When the waterborne polyurethane dispersion is applied in any conventional manner as by brushing, rolling, spraying, and the like, it is dried at desirably elevated temperatures such as about 60 to about 250° C. As noted above, if a urethane crosslinking agent is utilized during the drying step, the polyurethane will be crosslinked. The coating of this invention generally has good resistance to moisture, good abrasion resistance, good chemical resistance, low coefficient of friction values, but yet remain flexible at low temperatures. Unexpectedly, the coatings of the present invention generally have a lower coefficient of friction at lower fluorine levels than other fluorine containing polymers.

An alternative embodiment of the present invention is the utilization of free radical, radiation addition polymerizable monomers and/or oligomers which can be added to the polyurethane waterborne solution with the blended or commingled solution containing the monomers and/or oligomers therein added to a substrate, dried, and the monomers subsequently polymerized by the application of the radiation such as ultraviolet light. Such radiation polymerization monomers and/or oligomers are unsaturated and have a total of from 2 to about 150 carbon atoms desirably from about 3 to about 75, and preferably from about 6 to 20 carbon atoms such as an ester of a ethylenically unsaturated carboxylic acid, herein referred to as a vinyl ester, such as acrylate and/or methacrylate, and especially alkoxylated (meth)acrylate where said "meth" group may or may not exist. These monomers and/or oligomers can generally be classified as monofunctional, difunctional, trifunctional, and multifunctional such as monofunctional, difunctional; etc., acrylates. It is to be understood that whenever the term "(meth)" is utilized, that the utilization of the methyl group in a compound is optional.

Examples of suitable monofunctional monomers include various acrylates such as 2-phenoxyethyl acrylate, ethoxylated phenol monoacrylate, lauryl acrylate, hexadecyl acrylate, stearyl acrylate, tripropylene glycol, methylether monoacrylate, neopentylglycol propoxylate(2)methylether monoacrylate, propoxylated(2–20)nonylphenol monoacrylate, and the like. Examples of other suitable alkyl(meth)acrylates have from 1–20 carbon atoms in the alkyl group and include methyl(meth)acrylate, ethyl(meth)acrylate, propyl(meth)acrylate, isopropyl(meth)acrylate, butyl(meth)acrylate, 2-ethyl(meth)acrylate, octyl(meth)acrylate, isobornyl(meth)acrylate, dodecyl(meth)acrylate, isobornyl acrylate, and cyclohexyl(meth)acrylate, and the like. Examples of suitable (meth)acrylates having ether groups include 2-methoxy-ethylmethacrylate, 2-ethoxyethylmethacrylate, and 3-methoxypropylmethacrylate, and the like. Examples of suitable hydroxyalkyl(meth)acrylates include 2-hydroxethyl(meth)acrylate, 2-hydroxypropyl(meth)acrylate, 4-hydroxybutylacrylate, 6-hydroxyhexylacrylate, p-hydroxycyclohexyl (meth)acrylate, hydroxypolyethylene glycol(meth)acrylates, hydroxypolypropylene glycol(meth) acrylates and alkoxy derivatives thereof, and the like.

Examples of difunctional compounds include various acrylates such as 1-6-hexanediol diacrylate, bispheonol A ethoxylated diacrylate, polyethylene glycol diacrylate (200–600), tripropylene glycol diacrylate, neopentylglycol propoxylate(2) diacrylate, ethoxylated(2) neopentyl glycol diacrylate, dipropylene glycol diacrylate, trimethylolpropane ethoxylated(3)methyether diacrylate, and the like.

Examples of trifunctional compounds include various acrylates such as trimethylolpropane triacrylate, trimethylolpropane propoxylate(5–20)triacrylate, propoxylated(4) glycerol triacrylate, ethoxylated (3) trimethylolpropane triacrylate, propoxylated pentaerythritol triacrylate, and the like.

Examples of tetrafunctional compounds include various acrylates such as ditrimethylolpropane tetraacrylate, dipentaerythritol mono-hydroxy pentaacrylate, and the like.

Suitable substituted (meth)acrylate compounds include (meth)acrylamide, (meth)acrylonitrile, N-methylol(meth)acrylamide, and N-alkyl(meth)acrylamides, and the like. Other suitable compounds which are simply classified as mono-unsaturated compounds include vinylchloride, vinylacetate, vinylpropionate, as well as vinylpyrrolidone, and the like.

A preferred class of free radical free polymerizable oligomers of the various above noted alkoxylated (meth) acrylate monomers generally contain 2 to about 4 or more acrylate and/or methacrylate groups or combinations of the same within the same oligomer. The ester portion of the acrylate is generally an aliphatic and desirably an alkyl having from 1 to about 10 carbon atoms. The acrylates are alkoxylated, meaning that they contain one or more alkoxy groups between the acrylate end groups and often times have a core or nucleus compound therein as known to the art and the literature such as neopentyl glycol or tripropylene glycol pentaerythritol. Generally the number of alkoxyl groups within the compound is from about 3 to about 50 with from about 3 to about 20 being preferred. Suitable alkoxy groups generally include methoxy, or ethoxy, or propoxy. Such alkoxylated acrylates are commercially available as Sartomer SR9035, SR399, SR444, and the like, all from Sartomer.

Other monomers and oligomers include urethane acrylates, epoxy acrylates, epoxy methacrylates, acrylated epoxy oligomers, acrylated aliphatic urethane oligomers, acrylated aromatic urethane oligomers, acrylated polyesters oligomers, acrylated acrylic oligomers, methacrylates, and the like.

The amount of the one or more free radically polymerizable monomers or oligomers such as the above noted vinyl esters as well as the alkoxylated acrylate monomers, is generally from about 2 to about 75, desirably from about 3 to about 30, and preferably from about 5 to about 10 parts by weight for every 100 parts by weight of the polyurethane containing polyfluorooxetane blocks therein.

A class of suitable radiation initiators such as photoinitiators, or combinations of photoinitiators and photoactivators include benzophenone and substituted benzophenones, benzoin and its derivatives such as benzoin butyl ether and benzoin ethyl ether, benzil ketals such as benzil dimethyl ketal acetophenone derivatives such as α,α-diethoxyacetophenone and α,α-dimethyl-α- hydroxyacetophenone, benzoates such as methyl-o-benzoyl benzoate, thioxaothones, Michler's ketone, and acylphosphine oxides or bis-acylphosphine oxides. Examples of other photo initiators include hydroxylcyclohexyl phenyl ketone (HCPK), 2-benzyl-2-N, N-dimethylamino-1-(4-morpholino phenyl)-1-butarione (DBMP), 1-hydroxyl cyclohexyl phenyl ketone, beozophenone, 2-methyl-1-(4-methylthio)phenyl-2-morpholino propan-1-onc (MMP), and the like.

Ultraviolet light free radical initiators also include the various nitrogen containing compounds such as AIBN (Azobisisobutyronitrile and Azobutyronitrile)

Should the vinyl ester be reacted by heat instead of radiation, then in lieu of the ultraviolet light free radical initiators, etc., thermal free radical initiators such as various peroxides can be utilized as for example benzoyl peroxide, t-butyl peroxypivalate, 2,4-dichloro-benzoyl peroxide, decanoylperoxide, propionyl peroxide, hydroxyheptyl peroxide, cyclohexanone peroxide, 2,5-dimethylhexyl-2,5-di(peroxy-benzoate), t-butyl perbenzoate, dicumyl peroxide, 2,5-dimethyl-2,5-di(t-butylperoxy)hexyne-3,2,5-di-methyl 2,5-di(t-butylperoxy)hexane, 3,5-dimethyl-2,5-di(benzoyl-peroxy)hexane, di-t-butyl peroxide, p-menthane hydroperoxide, cumene hydroperoxide, 2,5-dimethyl-2,5-di (hydroxperoxy)hexane, t-butyl hydroperoxide, lauroyl peroxide, t-amyl perbenzoate, or mixtures thereof. Preferred organic peroxides are benzoyl peroxide and t-butyl perbenzoate.

The amount of the various photo initiators such as ultraviolet light initiators or thermal initiators is generally from about 0.5 to about 15, desirably from about 2 to about 10, and preferably from about 4 to about 8 parts by weight per 100 parts by weight of the one or more different polymerizable monomers or oligomers such as the alkoxylated acrylates.

The above noted free radical polymerizable monomers or oligomers as well as the initiators therefore are added to the waterborne polyurethane solution and mixed. Optionally, in addition thereto, various other additives can be added to impart favorable end properties to the resulting mixed, blended or co-mingled polyurethane-addition polymer composition. Such additives include various urethane crosslinking agents, various flattening agents, various scratch and/or mar resistant agents, wetting agents, and the like.

Flattening agents are added to lower the gloss of the coating surface. The flattening agent migrates to the surface of the coating as the coating is dried. This produces a rough surface that randomly scatters reflected light, which creates a matte appearance.

Important considerations for selection of a flattening agent are particle size distribution, rheological effects, color/clarity, ease of dispersion and good suspension in coating solution. Typically, flattening agents are particulate materials with average particle sizes in the range of 3–12 microns. Examples of flattening agents include various urea-formaldehydes, various silicas such as precipated silica and fumed silica, talc, alumina, or calcium-carbonate, and the like.

Examples of suitable urea-formaldehyde flattening agents include Pergopak M3 (mean particle size 5–7μ), from Lonza of New Jersey. Examples of suitable silica flattening agents include Syloid 7000, Syloid C-907 (a synthetic amorphacylica wherein the surface is treated with a hydrocarbon-type wax) from W. R. Grace of Maryland. The amount of such flattening agents will depend on the amount of initial gloss and the desired flatness desired. Generally speaking, the amount of such flattening agents is from about 0.1 to about 40 parts by weight, and preferably from about 0.5 to about 10 parts by weight based upon the total weight of the polyurethane and the polyvinyl ester forming monomers or oligomers.

Initially, the waterborne polyurethane containing the polyfluorooxetane blocks therein is mixed with the free radical polymerizable monomers and oligomers with a suitable amount of initiators. At this point, the various optional additives can be added such as the above noted urethane crosslinking agent, a scratch resistance agent, a mar resistance agent, a flattening agent, a wetting agent, and the like. The aqueous mixture is then applied to a substrate and subjected to heat to drive off essentially all of the water at a temperature of from about 55° C. to about 95° C. The substrate can be any desirable compound and preferably is in the form of a sheet or a film such as plastic, for example polyester, nylon, polyolefin, and the like with polyvinyl chloride, either rigid or flexible being preferred. Other suitable substrates include various metals, paper, and the like. One suitable method includes applying a portion of the waterborne polyurethane-polyacid monomer mixture by roll coating the substrate or by utilizing a gravure method. The coating will contain the various optional additives as well as the free radical polymerizable monomers and oligomer and photoinitiators. The sheet or film layer on the substate is then subjected to UV light in any suitable manner as being conveyed thereunder, conveyed to a suitable container such as an oven wherein an appropriate source of UV lighting is applied, or the like. The intensity and wavelength of the UV light is sufficient to initiate free radical polymerization of the monomers and oligomers polymerized the same. For example, the free radical polymerization can be initiated with a mercury vapor lamp which emits UV light over a wavelength range of 200–450 nm. Typical light intensities from Hg vapor lamps are given below.

A band (390 nm–320 nm)–600 to 200 mW/cm2
B band (320 nm–280 nm)–500 to 175 mW/cm2
C band (260 nm–250 nm)–75 to 20 mW/cm2

UV sources with higher intensities can also be used. While the exact co-mingled polyurethane-polyvinyl ester, (e.g. polyacrylate) composition is not known, and not being bound thereto, it is thought that it can be a physical blend of the polyurethane and polyvinyl ester, or it can be an interpenetrating polymer blend thereof, or it can be a partially crosslinked system between the polyurethane and the polyvinyl ester, or any combination thereof, or one or more other types of compositions.

Regardless of the exact nature of the composition, such blended or co-mingled polyurethane-containing polyfluorooxetane blocks-polyvinyl ester polymer composition in the form of a sheet or film, on a substrate, i.e. a laminate, can be utilized in a variety of end use items. One desired end use application is as a coating for various products or end use items. Suitable products include desks, tables, or cabinet doors, wall covering, wood, or countertops. To form the coating, the laminate is adhered to the product with a suitable adhesive. Suitable adhesives include urethane, ethylene vinyl acetate, and epoxy based resins. The same can also be accomplished by a variety of other methods. One such method is simply to apply the commingled polyurethane-polyvinyl ester composition directly to the end product or end use item as by spraying or coating the same and then applying radiation as noted herein above to polymerize the vinyl ester monomers or oligomers. Such a method is not preferred. Another method which is desired is a thermoforming process or step in which a vacuum is generally applied to the end product to draw the co-mingled polyurethane-polyvinyl ester polymer composition laminate into contact therewith. Subsequently, or in conjunction therewith, heat is applied to the composition laminate to a suitable temperature to cause the same to adhere to the end product. It is thought that a crosslinked network can result through self-crosslinking as well as grafting of the polyurethane and the polyacid moiedies. However, the same is not known and accordingly this application is not bound thereto. If the co-mingled polyurethane-containing polyfluorooxetane blocks-polyvinyl ester layer of the laminate contains urethane crosslinking agents therein, once applied to the substrate, it is heated to a sufficient temperature to crosslink the polyurethane. Generally temperatures of from about 105° C. to about 230° C. and desirably from about 120° C. to about 140° C. are suitable. Crosslinking, naturally will form a more rigid coating. The polyurethane containing polyfluorooxetane blocks generally imparts flexibility, low refractive index, greater contact angle, and reduced coefficient of friction to the composition whereas the polyvinyl ester, such as polyacrylate, imparts hardness, chemical resistance, and gloss.

The polyurethane-containing polyfluorooxetane blocks-polyvinyl ester composition can be utilized for a variety of end uses such as in the formation of hard durable laminates having good scratch resistance, mar resistance, stain resistance, and solvent resistance; non-yellowing properties; low gloss; anti-static; and the like. Accordingly, suitable end use include laminates for desk tops, for bookcases, for table tops, for kitchen cabinets and doors, for electronic devices, molding, and the like, and the same can be made from wood, medium fiberboard, pressboard, plywood, metal, plastics and the like.

The invention will be better understood by reference to the following examples which serve to explain but not to limit the present invention.

EXAMPLES

Example 1

All the intermediate polyols were dried under reduced pressure (1–3 mm-Hg) at a temperature of 70° C. The isocyanate was used as received from the supplier. The reaction between the various diols and the isocyanate was carried out in a 1000-ml three-necked flask equipped with high stirrer, thermometer, reflux condenser and a nitrogen inlet-outlet. A continuous flow of nitrogen was maintained during the reaction at a rate of 0.5 cc/min. To the stirring reaction vessel were charged 0.46 pbw (parts by weight) Poly-3-methyl-3-[(2,2,2-trifluoroethoxy)methyloxetane diol i.e. poly 3-FOX diol obtained from Aerojet (GenCorp) of Sacramento, Calif., 27.79 pbw Lexorez 1600-55, a linear polyester polyol, and a dispersant containing acid groups such as dimethylopropionic acid (1.8 pbw), which has been dissolved in N-methylpyrrolidone (NMP) (2.0 pbw). Poly 3-FOX diol can be made as set forth in U.S. Pat. No. 5,650,483. The reactants were mixed and heated to 110–115° C. After 10 minutes, the reactor was cooled to 37° C. and dibutyl tin dilaurate was added (T-12) at a 0.01 pbw level. The contents were mixed for 5 minutes at temperature. The temperature was increased to 65° C. and 11.08 pbw Desmodur I (Isophorone diisocyanate or 3-isocyanate methyl-3,5,5-trimethyl cyclohexyl isocyanate was added with vigorous stirring throughout the addition, to insure good mixing. Samples of the reaction were taken to determine the isocyanate content using the di-n-butylamine method (ASTM D-1638-74), with the target value of 4.6%. After two hours the target isocyanate level was reached and the reaction products were cooled to 45° C.

A tertiary amine, triethylamine (TEA), was added to the reaction at a level of 1.4 pbw (TEA) at a temperature of about 50–80° C. The reaction was stirred for about 30 seconds to permit neutralization of the acid groups from dimethylolpropionic acid (DMPA). While stirring at a high rate of agitation (2,000 RPM), 54.3 pbw water was then added to the polyurethane prepolymer, the reaction was cooled to room temperature and a dispersion was obtained having a percent solids of 44%. 0.67 pbw ethylenediamine (EDA), as a chain extender, was added to the reaction products to complete the reaction.

A stable anionic waterborne polyurethane dispersion having a viscosity of less than 140 cps and solid content of about 44% resulted. Films were made throughout casting the dispersions into a glass mold and drying at 60° C. for 1 hr. The samples were post-dried for at room temperature for 72 hrs. Measurement of the films were performed on an Instron-Tensile Tester at 5 inches/minute of crosshead speed.

The procedure used in Example 1 was repeated for Examples 2 through 3.

| Component | Control | Example 1 | Example 2 | Example 3 |
|---|---|---|---|---|
| Poly 3-FOX diol (polyfluorooxetane) | 0 | 0.46 | 2.28 | 0 |
| Poly 7-FOX diol (polyfluorooxetane) | 0 | 0 | 0 | 2.25 |
| Lexorez 1600 (polyol intermediate) | 28.60 | 27.79 | 29.21 | 28.84 |
| Dimethyol propionic acid (dispersant) | 1.90 | 1.8 | 1.9 | 1.92 |
| N-methyl pryrollidione (solvent) | 2.3 | 2.0 | 1.77 | 1.75 |
| Dibutyl tin dilaurate (catalysts) | 0.01 | 0.01 | 0.01 | 0.01 |
| Desmodur (diisocyanate) | 11.36 | 11.08 | 8.29 | 11.69 |
| Triethylamine (neutralizer) | 1.3 | 1.4 | 1.46 | 1.45 |
| Water | 53.83 | 54.3 | 54.25 | 51.34 |
| Ethylenediamine (chain extender) | 0.64 | 0.67 | 0.77 | 0.72 |
| Physical Properties | | | | |
| Percent Solids | 44 | 46 | 43 | 43 |
| Brookfield Viscosity (CPS) (RVF #1 At 5 RPM) | 160 | 240 | 320 | 400 |
| Particle Size (nm) from CHDF | 91 | 69 | 69 | 76 |

Coating Preparation and Application

Paints for application to test panels were prepared from the following formulation

| Raw Material | Relative Weight |
|---|---|
| Water | 115 |
| Dispersant | 43 |
| Titanium Dioxide | 250 |
| Silica | 112 |
| Talc | 112 |
| BYK 021 | 2.5 |
| Disperse above to 7 + Hegman (<13 microns) | |
| PUD (OMNOVA Lumiflon) | 1381 |
| Water | 124 |
| Coalescent (B Cellosolve) | 124 |
| BYK 301 | 3 |

Note

Lumiflon FE-440 is a fluorinated resin from Zeneca Resins Coatings were applied to the following substrates:

Aluminum (Q-Panel Type A)
Cold Rolled Steel (Polished)
Iron Phosphates Cold Rolled Steel (Bonderite 1000)

The coatings were spray applied to the substrates, without pre-treatment, to a coating weight (dry) of 0.2 to 0.3 grams per 12 square inches. The plaques were baked for one minutes at 85° C., then cooled. A nominal 5 mil coating thickness was obtained for testing.

Cross Hatch Adhesion
Gardner Impact
Water Immersion (24 hrs at r.t),
Gasoline Immersion, (1 hr. at RT),
Abrasion resistance (ASTM 1 356)
Pencil Hardness (ASTM D3363)
QUV Resistance (UVA 340 Bulbs, wet & dry cycles)
Solvent Resistance (MEK & Toluene)
Coefficient of Friction (ASTM 1894)

TABLE I

CRITICAL PROPERTIES

|  | Lumiflon | Without FOX (control) | Example 1 | Example 2 | Example 3 |
|---|---|---|---|---|---|
| Adhesion Test |  |  |  |  |  |
| CRS | 0 | 100 | 100 | 100 | 100 |
| B1000 | 100 | 100 | 100 | 100 | 100 |
| Al | 0 | 100 | 100 | 100 | 100 |
| Pencil Hardness | B | 2B | 2B | 2B | 2B |
| Taber Abrasion (loss) | 0.10 g | 0.01 g | <0.01 | <0.001 | <0.001 |
| Chemical Resistance |  |  |  |  |  |
| Ethylene Glycol | No Effect | Slight Softening | Softens | Very Slight Softening | No Effect |
| Gasoline | Softens | Slight Softening | No Effect | No Effect | No Effect |
| Water Resistance | Stain and Blistering | No Effect | No Effect | No Effect | No Effect |
| Contact Angle Analysis Average | 84 | 74 | 101 | 86 | 73 |
| Coefficient of Friction ASTM 1894 Means Force 1.0–4.0 lbs. | 0.97 | 1.13 | 0.77 | 0.58 | 0.53 |

As apparent from the examples, the waterborne polyurethane dispersions of the present invention had improved chemical resistance as compared to the two controls, had a greater contact angle, and had dramatically reduced coefficient or friction.

While in accordance with patent statutes the best mode and preferred embodiment have been set forth, the scope of the invention is not limited thereto, but rather by the scope of the attached claims.

What is claimed is:

1. A waterborne polyurethane, comprising:
polyurethane particles dispersed in an aqueous medium, said polyurethane comprising:
at least one polyfluorooxetane repeat unit derived from a polyfluorooxetane oligomer, polymer, or copolymer;
at least one repeat unit derived from a polyol intermediate; and
at least one repeat unit derived from a hydroxyl containing carboxylic acid dispersaint;
said repeat units connected by a urethane linkage derived from at least one polyisocyanate;
wherein said polyurethane is free of a silyl group,
optionally wherein said polyurethane is chain extended; and
optionally wherein said polyurethane is crosslinked.

2. A waterborne polyurethane according to claim 1, wherein said polyfluorooxetane oligomer, or polymer, or copolymer, has repeat groups of the formula

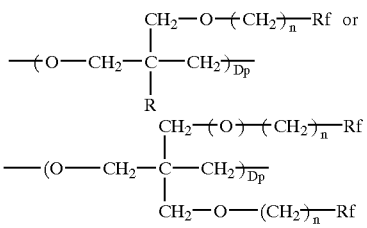

or combinations thereof, where n is the same or different and independently each repeat group is an integer of from 1 to about 5, R is hydrogen or an alkyl of from 1 to about 6 carbon atoms, and each Rf is the same or different and, independently, on each repeat unit is a linear or branched fluorinated alkyl of from 1 to about 20 carbon atoms, a minimum of 50 percent of the non-carbon atoms being fluorine atoms and the remaining atoms being H, I, Cl, or Br; or each Rf is the same or different and, independently, is an oxyperfluorinated polyether having from 4 to about 60 carbon atoms; and wherein said Dp is from about 2 to about 250.

3. A waterborne polyurethane according to claim 2, wherein said carboxylic acid dispersant is neutralized, wherein said polyol intermediate comprises one or more polyether polyols, one or more polythioether polyols, one or more polycarbonate polyols, one or more polyacetal polyols, one or more polyolefin polyols, one or more organic polyols, or one or more polyester polyols, or combinations thereof, and optionally wherein said polyfluorooxetane is a copolymer having at least one repeat unit derived from a monomer containing an epoxy (oxirane) functionality, a monomer having a 4-membered cyclic ether group, a monomer having a 5-membered cyclic ether group, 1,4-dioxane, 1,3-dioxane, trioxane, or caprolactone, or combinations thereof.

4. A waterborne polyurethane according to claim according to claim 3, wherein said hydroxyl terminated carboxylic acid dispersant contains one or more carboxyl groups and two or more hydroxyl groups; wherein the equivalent weight ratio of said at least one polyisocyanate to said at least one polyfluorooxetane oligomer, polymer, or copolymer, said at least one polyol intermediate, and said at least one hydroxyl containing carboxylic acid dispersant, is from about 0.8 to about 5.0; wherein the equivalent weight ratio of said at least one polyol intermediate to said at least one polyfluorooxetane oligomer, polymer, or copolymer is from about 2.0 to about 200; and wherein the weight ratio of said hydroxyl terminated carboxylic acid dispersant is from about 1 to about 15 percent based upon the total weight of said at least one polyfluorooxetane oligomer, polymer, or copolymer, said polyol intermediate, and said hydroxyl terminate carboxylic acid dispersant.

5. A waterborne polyurethane according to claim 4, wherein said polyurethane is chain extended; wherein said polyol intermediate is derived from one or more polyester polyols or one or more polycarbonate polyols; wherein said polyfluorooxetane oligomer, polymer, or copolymer is said copolymer, wherein said hydroxyl terminated carboxylic acid dispersant is

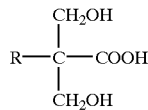

wherein R is hydrogen or an alkyl containing from 1 to about 16 carbon atoms; and wherein said polyisocyanate is IPDI, MDI, hexamethylene diisocyanate, or combinations thereof.

6. A waterborne polyurethane according to claim 5, wherein the amount of polyurethane solids in said aqueous medium is from about 20 to about 65 percent by weight, wherein the equivalent weight ratio of said polyisocyanate to said polyfluorooxetane copolymer, said polyol intermediate and said hydroxyl terminated carboxylic acid dispersant is from about 0.9 to about 1.8; wherein the equivalent weight ratio of said polyol intermediate to said polyfluorooxetane copolymer is from about 15 to about 50; and wherein the weight ratio of said hydroxyl terminated carboxylic acid dispersant is from about 2 to about 10 percent based upon the total weight of said polyfluorooxetane copolymer, said polyol intermediate, and said hydroxyl terminated carboxylic acid dispersant.

7. A coating, comprising; the dried composition of claim 1.

8. A coating, comprising; the dried composition of claim 3.

9. A coating, comprising; the dried composition of claim 6.

10. A coating, comprising; the dried, cured composition of claim 1.

11. A coating, comprising; the dried, cured composition of claim 3.

12. A coating, comprising; the dried, cured composition of claim 6.

13. A polyurethane-polyester composition, comprising a polyurethane and a polyvinyl ester polymer;

said polyurethane comprising at least one polyfluorooxetane repeat unit derived from a polyfluorooxetane oligomer, polymer, or copolymer;

at least one repeat unit derived from a polyol intermediate; and at least one repeat unit derived from a hydroxyl containing carboxylic acid dispersant;

said repeat units connected by a urethane linkage derived from at least one polyisocyanate;

wherein said polyurethane is free of a silyl group;

optionally wherein said polyurethane is chain extended;

optionally wherein said polyurethane is crosslinked; and said polyvinyl ester polymer derived from at least one radiation initiable free radical polymerizable vinyl ester monomer, or oligomer, or combinations thereof.

14. A polyurethane-polyvinyl ester composition according to claim 13, wherein said polyfluorooxetane oligomer or polymer has repeat groups of this formula

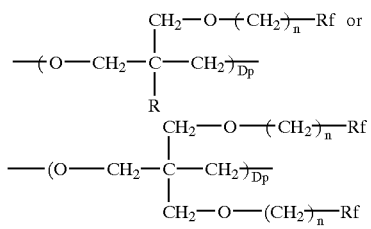

or combinations thereof, where n is the same or different and independently each repeat group is an integer of from 1 to about 5, R is hydrogen or an alkyl of from 1 to about 6 carbon atoms, and each Rf is the same or different and, independently, on each repeat unit is a linear or branched fluorinated alkyl of from 1 to about 20 carbon atoms, a minimum of 50 percent of the non-carbon atoms being fluorine atoms and the remaining atoms being H, I, Cl, r Br; or each Rf is the same or different and, independently, is an oxyperfluorinated polyether having from 4 to about 60 carbon atoms; and wherein said Dp is from about 2 to about 250, and wherein said vinyl ester monomer or oligomer is an ester of an ethylenically unsaturated carboxylic acid.

15. A polyurethane-polyvinyl ester composition according to claim 14, wherein said carboxylic acid dispersant is neutralized, wherein said polyol intermediate comprises one or more polyether polyols, one or more polythioether polyols, one or more polycarbonate polyols, one or more polyacetal polyols, one or more polyolefin polyols, one or more organic polyols, or one or more polyester polyols, or combinations thereof, and optionally wherein said polyfluorooxetane is a copolymer having at least one repeat unit derived from a monomer containing an epoxy (oxirane) functionality, a monomer having a 4-membered cyclic ether group, a monomer having a 5-membered cyclic ether group, 1,4-dioxane, 1,3-dioxane, trioxane, or caprolactone, or combinations thereof, and wherein said vinyl ester is an acrylate, or a methacrylate, or an alkoxylated (meth)acrylate comprising at least 2 (meth)acrylate groups wherein said (meth) group may or may not exist and from 3 to about 50 alkoxy groups, or combinations thereof.

16. A polyurethane-polyvinyl ester composition according to claim 15, wherein said hydroxyl terminated carboxylic acid dispersant contains one or more carboxyl groups and two or more hydroxyl groups; wherein the equivalent weight ratio of said at least one polyisocyanate to said at least one polyfluorooxetane oligomer, polymer, or copolymer, said at least one polyol intermediate, and said at least one hydroxyl containing carboxylic acid dispersant, is from about 0.8 to about 5.0; wherein the equivalent weight ratio of said at least one polyol intermediate to said at least one polyfluorooxetane oligomer, polymer, or copolymer is from about 2.0 to about 200; and wherein the weight ratio of said hydroxyl terminated carboxylic acid dispersant is from about 1 to about 15 percent based upon the total weight of said at least one polyfluorooxetane oligomer, polymer, or copolymer, said polyol intermediate, and said hydroxyl terminate carboxylic acid dispersant.

17. A polyurethane-polyvinyl ester composition according to claim 16, wherein said polyurethane is chain extended; wherein said polyol intermediate is derived from one or more polyester polyols or one or more polycarbonate polyols; wherein said polyfluorooxetane oligomer, polymer, or copolymer is said copolymer, wherein said hydroxyl terminated carboxylic acid dispersant is

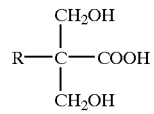

wherein R is hydrogen or an alkyl containing from 1 to about 16 carbon atoms; and wherein said polyisocyanate is IPDI, MDI, hexamethylene diisocyanate, or combinations thereof, and wherein said vinyl ester oligomer comprises said alkoxylated (meth)acrylate, wherein the number of said (meth)acrylate groups is from about 2 to about 4, wherein the ester portion of said (meth)acrylate is an alkyl having from 1 to 10 carbon atoms, and wherein the amount of said alkoxy groups is from about 3 to about 20, wherein said alkoxylated (meth)acrylate is UV polymerizable, and wherein the amount of said alkoxylated (meth)acrylated is from about 5 to about 75 parts by weight for every 100 parts by weight of said polyurethane.

18. A polyurethane-polyvinyl ester composition according to claim 17, wherein the equivalent weight ratio of said polyisocyanate to said polyfluorooxetane copolymer, said polyol intermediate and said hydroxyl terminated carboxylic acid dispersant is from about 0.9 to about 1.8; wherein the equivalent weight ratio of said polyol intermediate to said polyfluorooxetane copolymer is from about 15 to about 50; and wherein the weight ratio of said hydroxyl terminated carboxylic acid dispersant is from about 2 to about 10 percent based upon the total weight of said polyfluorooxetane copolymer, said polyol intermediate, and said hydroxyl terminated carboxylic acid dispersant.

19. A polyurethane-polyvinyl ester composition according to claim 13, wherein said polyurethane is crosslinked.

20. A polyurethane-polyvinyl ester composition according to claim 16, wherein said polyurethane is crosslinked.

21. A polyurethane-polyvinyl ester composition according to claim 18, wherein said polyurethane is crosslinked.

22. A laminate, comprising:
a coating on a substrate, said coating comprising the dried composition of claim 1.

23. A laminate, comprising:
a coating on a substrate, said coating comprising the dried composition of claim 2.

24. A laminate, comprising:
a coating on a substrate, said coating comprising the dried composition of claim 3.

25. A laminate, comprising:
a coating on a substrate, said coating comprising the dried composition of claim 4.

26. A laminate, comprising:
a coating on a substrate, said coating comprising the dried composition of claim 5.

27. A laminate, comprising:
a coating on a substrate, said coating comprising the dried composition of claim 6.

28. A laminate according to claim 22, wherein said substrate is plastic, paper, a wood containing article, a metal, or combinations thereof.

29. A laminate according to claim 25, wherein said substrate is plastic, paper, a wood containing article, a metal, or combinations thereof.

30. A laminate according to claim 27, wherein said substrate is plastic, paper, a wood containing article, a metal, or combinations thereof.

31. A laminate according to claim 23, wherein said substrate is a plastic comprising polyvinyl chloride, nylon, polyester, polyolefin, polyurethane, polystyrene, polyacrylate, polycarbonate, or combinations thereof.

32. A laminate according to claim 25, wherein said substrate is a fiber comprising polyester, polyolefin, nylon, or combinations thereof.

33. A laminate according to claim 27, wherein said substrate is a carpet fiber comprising polyester, polyolefin, nylon, or combinations thereof.

34. A laminate, comprising:
a substrate, and a substrate coating comprising the composition of claim 13.

35. A laminate, comprising:
a substrate, and a substrate coating comprising the composition of claim 15.

36. A laminate, comprising:
a substrate, and a substrate coating comprising the composition of claim 18.

37. A laminate, comprising:
a substrate, and a substrate coating comprising the composition of claim 19.

38. A laminate, comprising:
a substrate, and a substrate coating comprising the composition of claim 21.

39. A coating comprising the composition of claim 13.
40. A coating comprising the composition of claim 15.
41. A coating comprising the composition of claim 18.

42. A process for making a waterborne polyurethane dispersion, comprising the steps of:
reacting at least one polyisocyanate with at least one polyol intermediate, at least one hydroxyl terminated carboxylic acid dispersant, and at least one polyfluorooxetane oligomer, polymer, or copolymer to form a polyurethane;
neutralizing said polyurethane;
dispersing said neutralized polyurethane in water;
optionally chain-extending said polyurethane,
optionally crosslinking said polyurethane, and
wherein said polyurethane is free of a silyl group.

43. A process according to claim 42, wherein said polyfluorooxetane oligomer or polymer has repeat groups of the formula

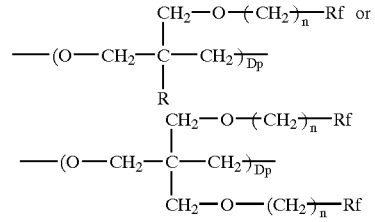

or combinations thereof, where n is the same or different and, independently, each repeat group is an integer of from 1 to about 5, R is hydrogen or an alkyl of from 1 to about 6 carbon atoms, and each Rf is the same or different and, independently, on each repeat unit is a linear or branched fluorinated alkyl of 1 to about 20 carbon atoms, a minimum of 50 percent of the non-carbon atoms being fluorine atoms and the remaining atoms being H, I, Cl, or Br; or each Rf is the same or different and, independently, is an oxyperfluorinated polyether having from 4 to about 60 carbon atoms, and wherein said Dp is from about 2 to about 250; wherein said polyol intermediate comprises one or more polyether polyols, one or more polythioether polyols, one or more polycarbonate polyols, one or more polyacetal polyols, one or more polyolefin polyols, one or more organic polyols, or one or more polyester polyols, or combinations thereof, and optionally wherein said polyfluorooxetane is a copolymer having at least one repeat unit derived from a monomer containing an epoxy (oxirane) functionality, a monomer having a 4-membered cyclic ether group, a monomer having a 5-membered cyclic ether group, 1,4-dioxane, 1,3-dioxane, trioxane, or caprolactone, or combinations thereof; and wherein said hydroxyl terminated carboxylic acid dispersant contains one or more carboxyl groups and two or more hydroxyl groups.

44. A process according to claim 43, including chain extending said polyurethane and drying said polyurethane, wherein the equivalent weight ratio of said at least one polyisocyanate to said at least one polyfluorooxetane oligomer, polymer, or copolymer, said at least one polyol intermediate, and said at least one hydroxyl containing carboxylic acid dispersant, is from about 0.8 to about 5.0; wherein the equivalent weight ratio of said at least one polyol intermediate to said at least one polyfluorooxetane oligomer, polymer, or copolymer is from about 2.0 to about 200; and wherein the equivalent weight ratio of said hydroxyl terminated carboxylic acid dispersant is from about 1 to about 15 percent based upon the total equivalent weight of said at least one polyfluorooxetane oligomer, polymer, or copolymer, said polyol intermediate, and said hydroxyl terminate carboxylic acid dispersant.

45. A process according to claim 44, wherein said polyol intermediate is derived from one or more polyester polyols or one or more polycarbonate polyols; wherein said polyfluorooxetane oligomer, polymer, or copolymer is said copolymer; and wherein said polyisocyanate is IPDI, MDI, hexamethylene diisocyanate, or combinations thereof.

46. A process according to claim 45, including crosslinking said polyurethane.

47. A process comprising:
mixing one or more radiation initiable free radical polymerizable vinyl ester monomers with a neutralized waterborne polyurethane dispersion to form a mixture thereof;
said polyurethane formed by reacting at least one polyisocyanate with at least one polyol intermediate, at least one hydroxyl terminated carboxylic acid dispersant, and at least one polyfluorooxetane oligomer, polymer, or copolymer;
neutralizing said polyurethane;
dispersing said neutralized polyurethane in water;
optionally chain-extending said polyurethane,
optionally crosslinking said polyurethane, and
wherein said polyurethane is free of a silyl group.

48. A process according to claim 47, including drying said polyurethane-free radical polymerizable vinyl ester monomer or oligomer mixture; and
polymerizing said free radical polymerizable monomers or oligomers in the presence of radiation and forming a co-mingled polyurethane-polyvinyl ester composition;
wherein said polyfluorooxetane oligomer or polymer has repeat groups of the formula

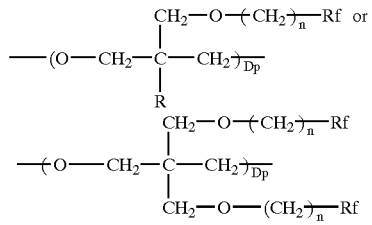

or combinations thereof, where n is the same or different and, independently, each repeat group is an integer of from 1 to about 5, R is hydrogen or an alkyl of from 1 to about 6 carbon atoms, and each Rf is the same or different and, independently, on each repeat unit is a linear or branched fluorinated alkyl of 1 to about 20 carbon atoms, a minimum of 50 percent of the non-carbon atoms being fluorine atoms and the remaining atoms being H, I, Cl, or Br; or each Rf is the same or different and, independently, is an oxyperfluorinated polyether having from 4 to about 60 carbon atoms, and wherein said Dp is from about 2 to about 250; wherein said polyol intermediate comprises one or more polyether polyols, one or more polythioether polyols, one or more polycarbonate polyols, one or more polyacetal polyols, one or more polyolefin polyols, one or more organic polyols, or one or more polyester polyols, or combinations thereof, and optionally wherein said polyfluorooxetane is a copolymer having at least one repeat unit derived from a monomer containing an epoxy (oxirane) functionality, a monomer having a 4-membered cyclic ether group, a monomer having a 5-membered cyclic ether group, 1,4-dioxane, 1,3-dioxane, trioxane, or caprolactone, or combinations thereof; and wherein said hydroxyl terminated carboxylic acid dispersant contains one or more carboxyl groups and two or more hydroxyl groups.

49. A process according to claim 48, including chain extending said polyurethane, wherein the equivalent weight ratio of said at least one polyisocyanate to said at least one polyfluorooxetane oligomer, polymer, or copolymer, said at least one polyol intermediate, and said at least one hydroxyl containing carboxylic acid dispersant, is from about 0.8 to about 5.0; wherein the equivalent weight ratio of said at least one polyol intermediate to said at least one polyfluorooxetane oligomer, polymer, or copolymer is from about 2.0 to about 200; and wherein the equivalent weight ratio of said hydroxyl terminated carboxylic acid dispersant is from about 1 to about 15 percent based upon the total equivalent weight of said at least one polyfluorooxetane oligomer, polymer, or copolymer, said polyol intermediate, and said hydroxyl terminate carboxylic acid dispersant, and
wherein said vinyl ester is an acrylate, or a methacrylate, or an alkoxylated (meth)acrylate comprising at least 2 (meth)acrylate groups wherein said (meth) group may or may not exist and from 3 to about 50 alkoxy groups, or combinations thereof.

50. A process according to claim 49, wherein said polyol intermediate is derived from one or more polyester polyols or one or more polycarbonate polyols; wherein said polyfluorooxetane oligomer, polymer, or copolymer is said copolymer; and wherein said polyisocyanate is IPDI, MDI, hexamethylene diisocyanate, or combinations thereof, and
wherein said vinyl ester oligomer comprises said alkoxylated (meth)acrylate, wherein the number of said (meth)acrylate groups is from about 2 to about 4, wherein the ester portion of said (meth)acrylate is an alkyl having from 1 to 10 carbon atoms, and wherein the amount of said alkoxy groups is from about 3 to about 20, wherein said alkoxylated (meth)acrylate is UV polymerizable, and wherein the amount of said alkoxylated (meth)acrylated is from about 5 to about 75 parts by weight for every 100 parts by weight of said polyurethane.

51. A process according to claim 47, including crosslinking said polyurethane.

52. A process according to claim 50, including crosslinking said polyurethane.

53. A polyurethane composition, comprising:
the reaction product of at least one polyfluorooxetane oligomer, polymer, or copolymer; at least one polyol intermediate; at least one hydroxyl containing carboxylic acid dispersant; and
at least one polyisocyanate;
wherein said polyurethane is free of a silyl group,
optionally wherein said polyurethane is chain extended; and
optionally wherein said polyurethane is crosslinked.

54. A polyurethane composition according to claim 53, wherein said polyfluorooxetane oligomer, or polymer, or copolymer, has repeat groups of the formula

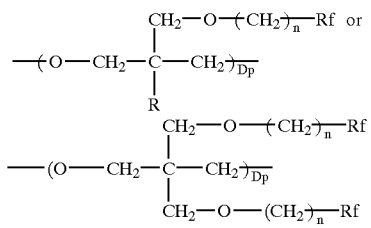

or combinations thereof, where n is the same or different and independently each repeat group is an integer of from 1 to about 5, R is hydrogen or an alkyl of from 1 to about 6 carbon atoms, and each Rf is the same or different and, independently, on each repeat unit is a linear or branched fluorinated alkyl of from 1 to about 20 carbon atoms, a minimum of 50 percent of the non-carbon atoms being fluorine atoms and the remaining atoms being H, I, Cl, or Br; or each Rf is the same or different and, independently, is an oxyperfluorinated polyether having from 4 to about 60 carbon atoms; and wherein said Dp is from about 2 to about 250.

55. A polyurethane composition according to claim 54, wherein said carboxylic acid dispersant is neutralized, wherein said polyol intermediate comprises one or more polyether polyols, one or more polythioether polyols, one or more polycarbonate polyols, one or more polyacetal polyols, one or more polyolefin polyols, one or more organic polyols, or one or more polyester polyols, or combinations thereof, and optionally wherein said polyfluorooxetane is a copolymer having at least one repeat unit derived from a monomer containing an epoxy (oxirane) functionality, a monomer having a 4-membered cyclic ether group, a monomer having a 5-membered cyclic ether group, 1,4-dioxane, 1,3-dioxane, trioxane, or caprolactone, or combinations thereof.

56. A polyurethane composition according to claim 55, wherein said hydroxyl terminated carboxylic acid dispersant contains one or more carboxyl groups and two or more hydroxyl groups; wherein the equivalent weight ratio of said at least one polyisocyanate to said at least one polyfluorooxetane oligomer, polymer, or copolymer, said at least one polyol intermediate, and said at least one hydroxyl containing carboxylic acid dispersant, is from about 0.8 to about 5.0; wherein the equivalent weight ratio of said at least one polyol intermediate to said at least one polyfluorooxetane oligomer, polymer, or copolymer is from about 2.0 to about 200; and wherein the weight ratio of said hydroxyl terminated carboxylic acid dispersant is from about 1 to about 15 percent based upon the total weight of said at least one polyfluorooxetane oligomer, polymer, or copolymer, said polyol intermediate, and said hydroxyl terminate carboxylic acid dispersant.

57. A polyurethane composition according to claim 56, wherein said polyurethane is chain extended; wherein said polyol intermediate is derived from one or more polyester polyols or one or more polycarbonate polyols; wherein said polyfluorooxetane oligomer, polymer, or copolymer is said copolymer, wherein said hydroxyl terminated carboxylic acid dispersant is

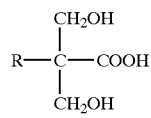

wherein R is hydrogen or an alkyl containing from 1 to about 16 carbon atoms; and wherein said polyisocyanate is IPDI, MDI, hexamethylene diisocyanate, or combinations thereof.

58. A polyurethane composition according to claim 57, wherein the amount of polyurethane solids in said aqueous medium is from about 20 to about 60 percent by weight, wherein the equivalent weight ratio of said polyisocyanate to said polyfluorooxetane copolymer, said polyol intermediate and said hydroxyl terminated carboxylic acid dispersant is from about 0.9 to about 1.8; wherein the equivalent weight ratio of said polyol intermediate to said polyfluorooxetane copolymer is from about 15 to about 50; and wherein the weight ratio of said hydroxyl terminated carboxylic acid dispersant is from about 2 to about 10 percent based upon the total weight of said polyfluorooxetane copolymer, said polyol intermediate, and said hydroxyl terminated carboxylic acid dispersant.

* * * * *